INVENTOR
EDWARD L. KRIEGER

BY Thomas J. Nikolai
ATTORNEY

CHARACTER RECOGNITION SYSTEM USING SELECTIVELY POSITIONED
LIGHT CONDUCTING RODS AND INCLUDING CONVERSION
TO EXCESS THREE BINARY CODE

Filed Dec. 22, 1964

| OUTPUT ROD | | GROUP | INPUT ROD | | | |
|---|---|---|---|---|---|---|
| BINARY CODE | DIGIT | | 1 | 2 | 3 | 4 |
| 0011 | 0 | 26 | a3<br>a5<br>d2 | a3<br>a5<br>d2 | b2<br>b3<br>b5<br>c5<br>e2 | b2<br>b3<br>b5<br>c5<br>e2 |
| 0100 | 1 | 28 | b2<br>b3<br>b5 | a3<br>a5<br>c5<br>d2<br>e2 | b2<br>b3<br>b5 | b2<br>b3<br>b5 |
| 0101 | 2 | 30 | b5<br>e2 | a3<br>a5<br>b2<br>b3<br>c5<br>d2 | b5<br>e2 | a3<br>a5<br>b2<br>b3<br>c5<br>d2 |
| 0110 | 3 | 32 | a5<br>b2<br>e2 | a3<br>b3<br>b5<br>c5<br>d2 | a3<br>b3<br>b5<br>c5<br>d2 | a5<br>b2<br>e2 |
| 0111 | 4 | 34 | a5<br>b5<br>c5<br>d2 | a3<br>b2<br>b3<br>e2 | a3<br>b2<br>b3<br>e2 | a3<br>b2<br>b3<br>e2 |
| 1000 | 5 | 36 | a5<br>b2<br>b5<br>c5<br>d2<br>e2 | a3<br>b3 | a3<br>b3 | a3<br>b3 |
| 1001 | 6 | 38 | b2<br>b3<br>b5<br>c5<br>d2 | a3<br>a5<br>e2 | a3<br>a5<br>e2 | b2<br>b3<br>b5<br>c5<br>d2 |
| 1010 | 7 | 40 | a3<br>a5<br>b2<br>b3<br>b5<br>d2 | c5<br>e2 | a3<br>a5<br>b2<br>b3<br>b5<br>d2 | c5<br>e2 |
| 1011 | 8 | 42 | a3<br>b5<br>c5<br>e2 | a5<br>b2<br>b3<br>d2 | a3<br>b5<br>c5<br>e2 | a3<br>b5<br>c5<br>e2 |
| 1100 | 9 | 44 | a3<br>a5<br>b5<br>c5<br>d2 | a3<br>a5<br>b5<br>c5<br>d2 | b2<br>b3<br>e2 | b2<br>b3<br>e2 |

Fig. 9

United States Patent Office 3,412,255

Patented Nov. 19, 1968

3,412,255

CHARACTER RECOGNITION SYSTEM USING SELECTIVELY POSITIONED LIGHT CONDUCTING RODS AND INCLUDING CONVERSION TO EXCESS THREE BINARY CODE

Edward L. Krieger, St. Paul, Minn., assignor to Sperry Rand Corporation, New York, N.Y., a corporation of Delaware Filed Dec. 22, 1964, Ser. No. 420,327

14 Claims. (Cl. 250—227)

This invention relates to a set of numeric characters which can be identified by observing the presence or absence of a portion of a character in each of eight specific areas contained in the space defined for the characters and to optical means for decoding the identified numeric character and tranlating it into an excess three binary code or into a decimal representation. More specifically, a fiber-optic character reader is used to decode an optical image into a binary form before any conversion from light energy to electrical energy.

In many applications today involving printed characters such as those found on adding machine tapes, cash register tapes, type-written ledgers and bills, it would be highly desirable to use a character reader which would automatically convert the typed character to coded electrical form.

Prior art systems utilizing character readers involve either scanning or correlation techniques which require the systems to become complex and costly. Further, it would be desirable to have a character reader which could recognize a character and immediately transform it into an appropriate code for use in a computer.

The present invention is designed to overcome the complexity of the prior art and to provide a character reader which recognizes a character and immediately it into an appropriate code for use in a computer.

A set of numeric characters was delineated having the property of being identifiable by observing the presence or absence of a portion of a character in each of eight specific areas contained in the space defined by a character. Each numeral is placed in a field containing 35 finite areas, such as squares, arranged in a 5 by 7 array. A coding process was developed which required the observation of only eight of the 35 areas or squares to determine which of the ten digits had been submitted for reading. This means that the fiber optic reader requires only eight input fibers in order to recognize any one of the ten digits. This requires that the character shape for each number be unique. Thus the input to the fiber optical character reader is similar to an eight bit input word of which a particular combination is developed for each of the numeric characters. The optical character reader accepts these eight inputs and transforms them into either a decimal notation or an excess three binary code.

It is an object of this invention to provide a set of numeric characters having the property of being identifiable by observing the presence or absence of a portion of a character in each of eight specific areas contained in the space defined by the character.

It is also an object of this invention to identify any of the specific numeric characters by optically observing patterns of light and no-light in the eight specific areas contained in the space defined by the character.

It is a further object of this invention to accept the optical information relating to the eight specific areas contained in the space defined by the character and convert that information into either a decimal system or an excess three binary code.

It is another object of this invention to translate a numeric character directly into an excess three binary code or a decimal system code by optical means.

A complete understanding of this invention and of these and various other features may be gained from the following detailed description and the accompanying drawings in which.

Figure 6A:
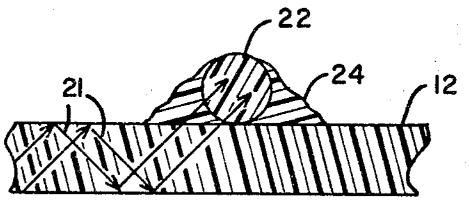
Figure 6B:
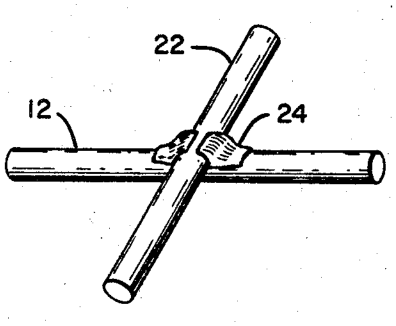
Figure 7:
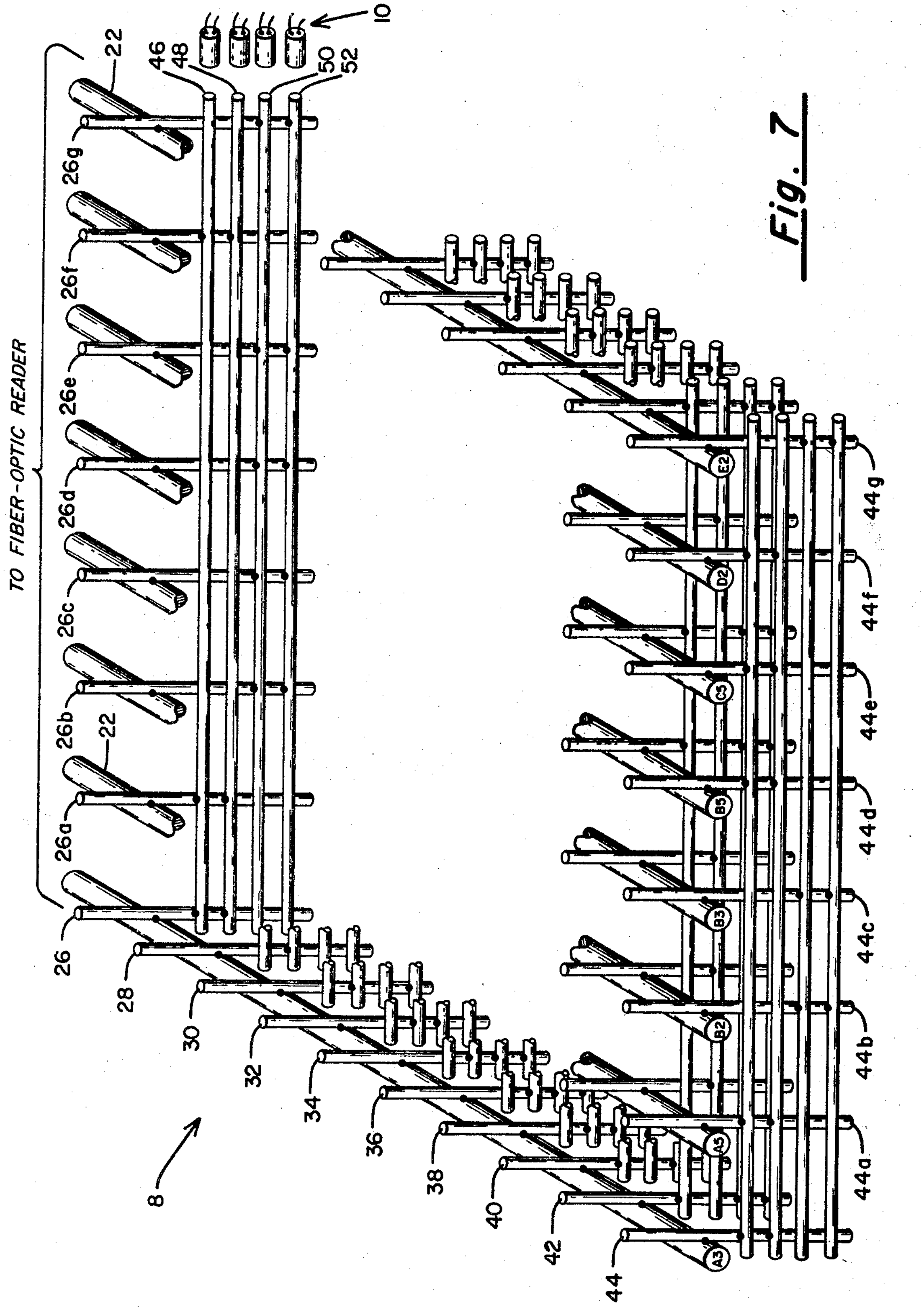
Figure 8:
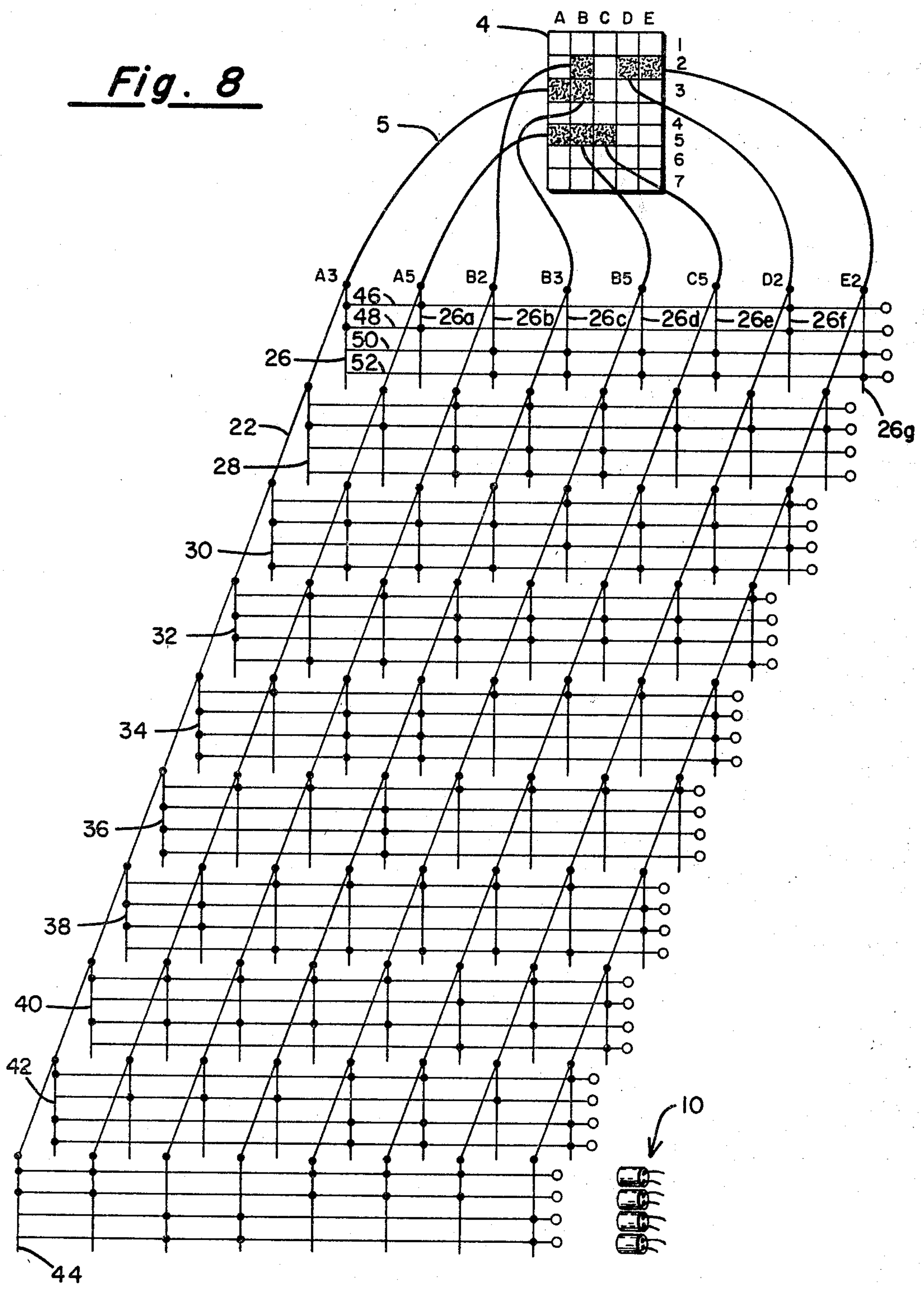

FIGS. 6*a* and 6*b* are drawings showing how one input optical fiber is connected to an output optical fiber;

FIG. 7 shows how the fiber optic rods may be connected together to form the memory and decoder for the excess three binary code converter;

FIG. 8 is a schematic representation of the entire excess three binary code inverter showing all of the connections between the input rods and the output rods which produce the proper output code for each numeric character input; and FIG. 9 is a table showing the excess three binary code, the digit which it represents, the group of output rods in FIG. 8 corresponding to that digit, and the connections between the individual input rods and the four output rods.

Figure 1:
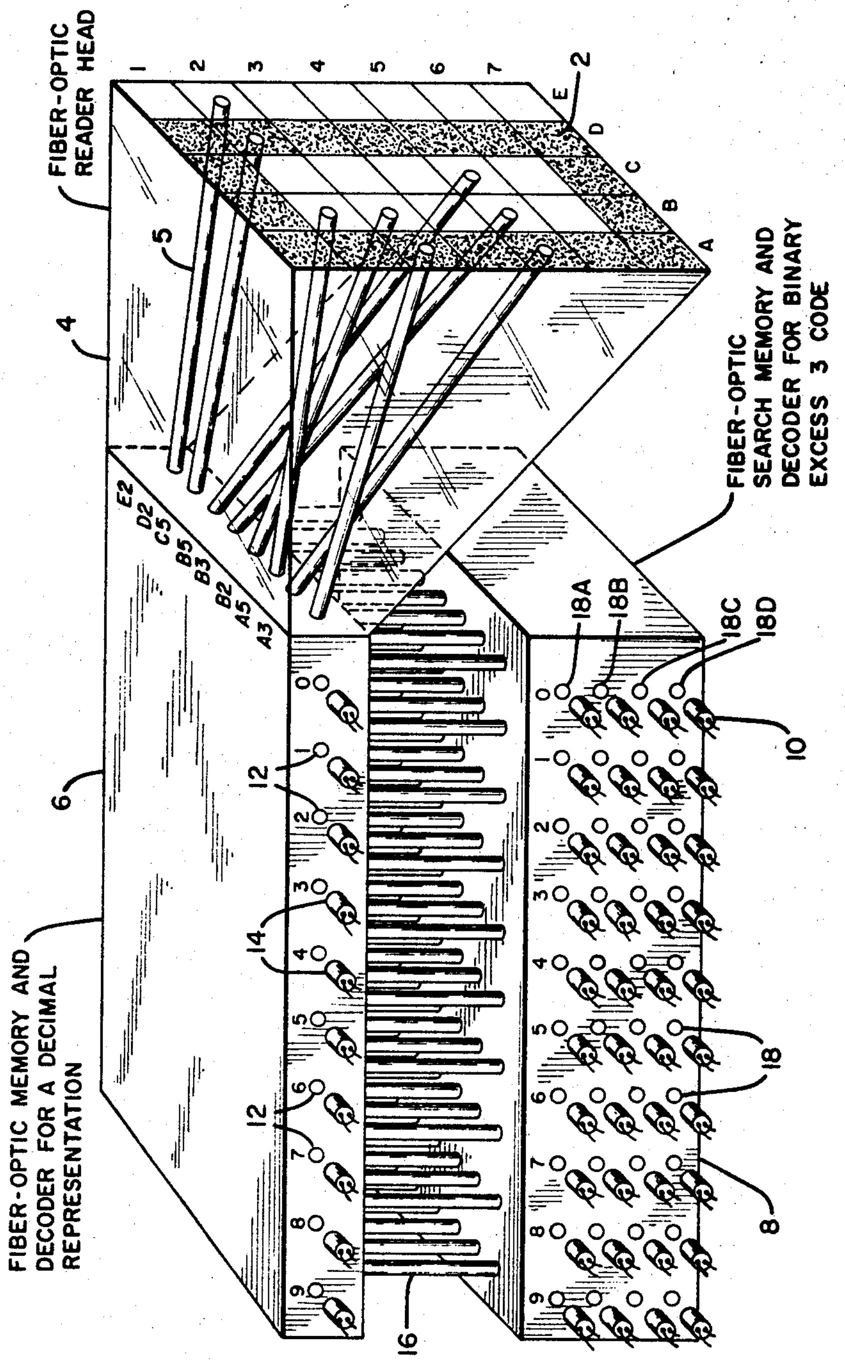
FIG. 1 is a representation of the fiber optic reader in conjunction with the memory and decoder for a decimal representation as well as the search memory and decoder for a binary excess three code.

The basic system is shown in FIG. 1 and consists of a character image 2, fiber optic reader or coding means 4, fiber optic memory and decoder 6 for decimal representation, photo diodes 14, fiber optic search memory and decoder 8 for binary excess 3 codes, and photo diodes 10.

The reflected image of the numeric character 2 being read is superposed on the face or viewing area of fiber optic reader 4 which has a field containing 35 finite areas in the form of squares arranged in a 5 by 7 array. Fiber rods 5 are coupled to eight particular ones of the 35 finite areas and, when a specific numeral is displayed and illuminated on the face of the fiber optic reader, light will pass through some of the rods 5 while other of the rods are shadowed by the darker numeral background. Thus certain of the rods 5 receive less light than the others depending upon which specific numeral is being displayed. Therefore, each unique numeric character superposed on the viewing area selectively covers the ends of a unique group of the light sensitive fiber optic rods.

The light or absence of light in each of the rods 5 as determined by the specific numeral or character 2 is transmitted to the fiber optic memory and decoder 6. Decoder 6 then presents light at the output of all rods 12 except the rod which is indicative of the numeral being displayed on the face of the fiber optic reader 4. Thus in the example shown in FIG. 1 with an "0" illuminated on the face of the fiber optic reader 4, each of the output rods 12 in decoder 6 will produce light and activate the corresponding photo diode 14 except that photo diode opposite the output rod indicating a "0" which will be dark.

Fiber rods 16, which consist of ten rows of eight rods in each row, transfer the light from the eight input rods from the fiber optic reader 4 to the search memory and decoder 8. Decoder 8 consists of 10 columns of four light rods 18 in each column which are so coupled to light rods 16 that all the rods 18 in any one column will have light outputs except in the column which indicates the numeral being viewed by the fiber optic reader 4. This particular column will then exhibit both light and dark outputs from rods 18 to indicate the excess three binary code for the particular numeric character being displayed. Thus, in the particular example shown in FIG. 1 wherein the numeric character representing a "0" is being displayed on the face of fiber optic reader 4, the output from decoder 8 on rods 18*a*, 18*b*, 18*c* and 18*d* would be such to indicate a 0011 or, in other words, there would be no light at the output of rods 18*a* and 18*b* while there would be light at the outputs of rods 18*c* and 18*d*. Photo diodes 10 opposite each of these rods would then indicate the proper code by producing appropriate electrical signals.

Figure 2:
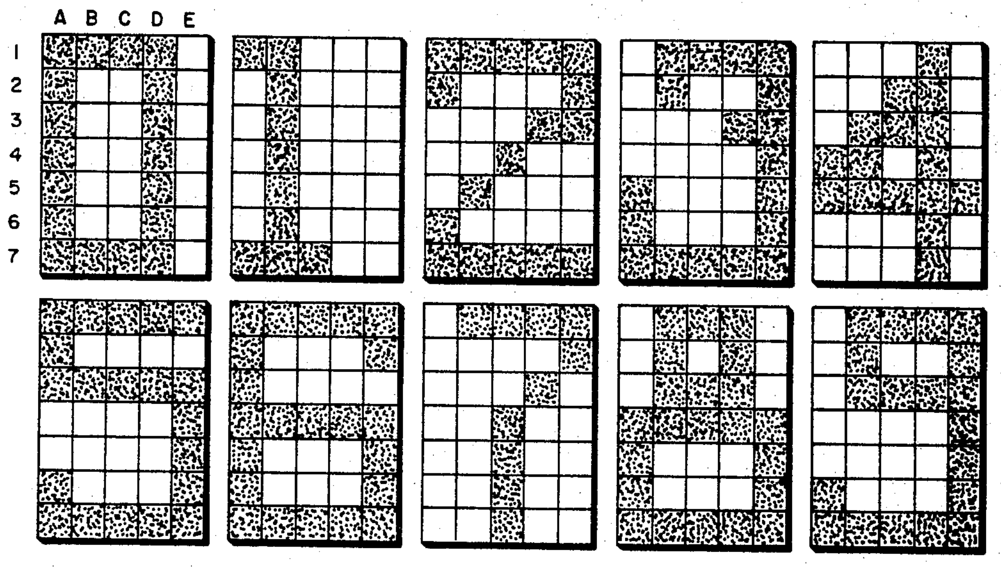
FIG. 2 shows the unique character shapes utilized in the present invention.

Consider now FIG. 2 which shows the set of 10 unique numeric characters which were designed to be read by the character reader 4. As can be seen, each of these characters is placed into a viewing area which is sub-divided into 35 squares. The horizontal rows are designated 1–7 while the vertical columns are designated *a, b, c, d,* and *e*. This is done so a specific area can be designated such as *b*2 or *c*3. A set of eight of these 35 areas was selected which will identify any one of the ten digits. These areas are *a*3, *a*5, *b*2, *b*3, *b*5, *c*5, *d*2, and *e*2. It will be noted that each of the numeric characters rests in a particular location in said viewing area.

Figure 3:
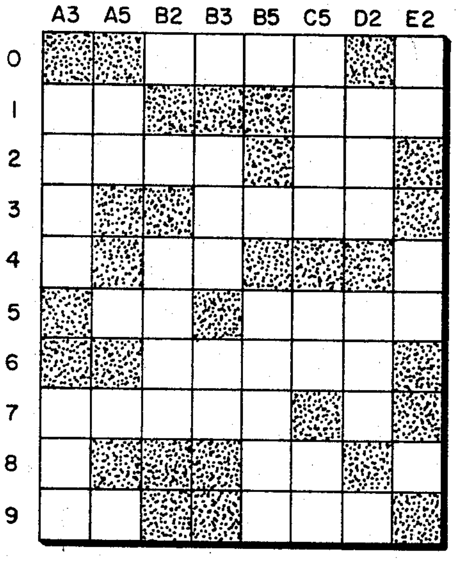
FIG. 3 is a table showing the coding arrangement for identifying the characters.

The particular combination or unique group of the 8 specific areas which may be used to identify each of the 10 numerical characters is shown in FIG. 3. As can be seen in FIG. 3 a "0" may be identified by the unique areas defined as *a*3, *a*5, and *d*2. It will be seen that no other character will cover the same three unique areas. Consider, for example, numeric character 6. While it will cover areas *a*3, and *a*5 it does not cover area *d*2 but rather covers area *e*2. Thus, if no light were to appear in areas *a*3, *a*5 and *d*2 it would be recognized that a "0" is being displayed on the face of the optic reader. Each of the other numeric characters may be so uniquely defined as shown in both FIGS. 2 and 3.

Figure 4:
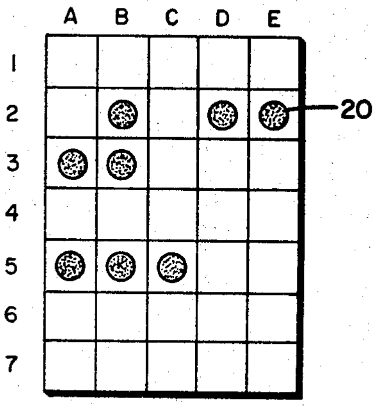
FIG. 4 shows the eight specific areas which determine which of the ten numeric characters have been submitted for reading.

FIG. 4 shows the viewing area or the character reading area of fiber optic reader 4. It will be seen that this area is also divided into 35 specific areas similar to the 5 by 7 array in which the numeric characters is placed. Circles 20 represent the ends of the optic fibers 5 shown in FIG. 1 which terminate in the viewing or character reading area of the fiber optic reader 4. Thus if a numeric character or the image of a numeric character is caused to project itself or its shadow on the viewing area of the fiber optic reader, certain of the fiber optic ends 20 will be covered or shadowed thus preventing light from entering those rods. If, for example, a "0" were displayed on the character reading area, the ends 20 of optic fibers *a*3, *a*5 and *d*2 would be covered thus preventing any light from entering those rods. Light would, however, enter rods *b*2, *b*3, *b*5, *c*5 and *e*2. Similarly, for any other numeric character, various ones of the eight optic fibers will be covered as shown in FIG. 3 and the rest will have light entering them. Rods 5 may have their end positioned in the particular portions of the viewing area by means of any suitable opaque potting material well known in the art such as epoxy.

Figure 5:
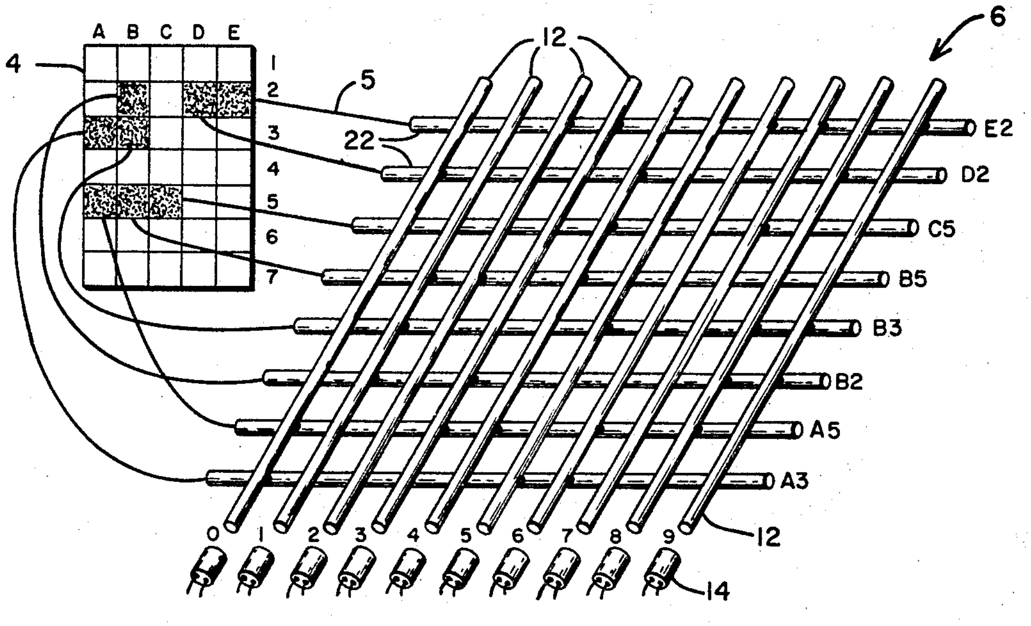
FIG. 5 shows how the input optical fibers are connected to the output optical fibers to form the search memory section and outputs for the numeric character to decimal code converter.

FIG. 5 shows in schematic form the viewing area or face of fiber optic reader 4 with light rods 5 connected to the eight specific areas which may be used to distinquish between each of the ten numeric characters. Light rods 5 are shown connected to the eight input rods 22 to decoder 6. It will be seen that decoder 6 consists of eight horizontal input rods each of which corresponds to one of the specific areas on the face of fiber optic reader 4 as well as ten light rods 12 which are connected in various places to the input rods 22. These connections are shown in FIG. 5 as a black dot at the intersection of an input rod and an output rod. These connections are made such that no light will appear in the output rod which is connected to those input rods representing the numeric character being displayed. Thus, if a "0" is being displayed on the face of the fiber optic reader 4, no light will be transmitted through light rods 5 to input rods *a*3, *a*5 and *d*2. It will be seen that the "0" output rod is connected to input rods *a*3, *a*5 and *d*2. Thus, no light will appear at the output of the "0" rod. However, it may be seen that since all other input rods have light, all other output rods will have light transferred to them and will exhibit light at their outputs.

It may appear that since light will travel from an input rod through a connection to an output rod that light will also travel from an input rod to an output rod and back to another input rod which has no light and thus illuminate all output rods. Thus, if no light were exhibited at the output of the rod representing a "0," light could theoretically travel on input rod *e*2 to output rod 6 and then travel down output rod 6 to input rod *a*5 (which is dark) and travel through input rod *a*5 to the "0" output rod and then illuminate the "0" output rod.

This cannot happen, however, since at each of the connections between an input and an output rod, only 10% of the input light is transferred to the intersecting rod. Thus, of all the light entering rod *e*2, only 10% of that is transferred to an output rod 6. At the juncture of output rod 6 and input rod *a*5, only 10% of the light in rod 6 will be transferred to rod *a*5. Therefore only 1% of the light in rod *e*2 will be transferred to input rod *a*5. At the intersection of input rod *a*5 and output rod "0," only 10% of that light will be transferred. Thus, a total of only 0.1% of all the input light to rod *e*2 will be coupled to output rod "0." While there are various paths throughout the decoder 6 through which light may travel from one rod to the other, it has been found in actual practice that there is a considerable contrast between the small amount of light appearing at the output of the rod which indicates the numeric character which is being displayed and the remaining rods. Thus, practically speaking no light appears at the output of the rod which indicates the numeric character being displayed.

The light coming into the search memory 6 from the fibers 5 whose ends are not covered by the character being displayed will be transferred to the output rods 12 as representing a "1." The rods 5 whose ends are covered by the character being displayed will represent a "0" for the output rods. Each output rod representing a particular numeric character is connected to the input rods from which no light is expected when that character is displayed on the viewing area. With the "0," no light is expected in rods *d*2, *a*3 or *a*5. When a "0" is placed in front of a character reader, no light appears on the output of the "0" rod whereas the remaining rods are connected to at least one input rod which has light. These remaining rods then will have light output. In other words, there will be 9 outputs which have light and one output which has no light.

With a photo diode 14 at the output of each rod 12, that rod which has no light as its output may be detected. If the photo diodes 14 are connected to appropriate circuits which will produce an output signal when no light is detected by the photo diodes and which do not produce outputs when light is detected by the photo diodes 14 it will be seen that an image of a numeric character may be reduced to an electrical signal by the appropriate photo diode connected to the output rod which has no light.

As can be seen in FIG. 5 the output rods cross each of the input rods but light is transferred from an input rod to an output rod only at those points indicated by the black dot. FIG. 6*a* discloses how light rays 21 are caused to transfer from an input rod to an output rod at these points. FIGS. 6*a* and 6*b* show connecting bead 24 as a light transferring medium which light couples the input fiber 22 to the output fiber 12 and which has an index or refraction similar to the fiber optic rods 22 and 12 in order that optimum transfer of light may take place between any input fiber 22 and an output fiber 12. One such type of material is known as Duco cement; however, it is to be understood that any type of cement or light transferring medium having an index of refraction similar to the fiber optic rods may be used as the connecting bead.

FIG. 7 shows in detail the construction of the fiber optic memory and decoder 8 for the excess three binary code. The eight fiber rods 22 in FIG. 7 are the same fiber rods 22 shown in FIG. 5 which are connected to the input rods 5 from the fiber optic reader 4. As shown in FIG. 7 each of the eight input rods 22 has attached to it ten vertical rods 26, 28, 30, 32, 34, 36, 38, 40, 42 and 44 which are merely extensions of the input rods. The output rods, in groups of four, are attached in various combinations to corresponding ones of the vertical rods which are attached to each of the eight input rods. The manner or combination by which the output rods in each group are attached to the corresponding vertical rods determines the particular code which that particular group will produce. Thus, the four output rods 46, 48, 50 and 52 form one group which produces a 0011 in the excess three binary code whenever a "0" is the numerical character being displayed on the viewing area of the character reader. As can be seen in FIG. 7 horizontal output rods 46 and 48 are attached to vertical rods 26, 26*a*, and 26*f*. These three vertical rods are connected respectively to input rods which represent the specific areas *a*3, *a*5 and *d*2 of the fiber optic reader. It will be recalled that specific areas *a*3, *a*5 and *d*2, when they are covered, represent a "0" as the numeric character being displayed on the face of the fiber optic reader. See FIG. 3. Thus no light will be present in the horizontal output rods 46 and 48. However, it can be seen that horizontal output rods 50 and 52 are attached to vertical rods 26*b*, 26*c*, 26*d*, 26*e* and 26*g* each of which is attached to an input rod which represents the remainder of the specific areas of the fiber optic reader and all of which should have light when a "0" is being displayed on the face of the fiber optic reader. It can therefore be seen that if horizontal output rods 46 and 48 have no light which represents a binary "0" and horizontal output rods 50 and 52 have light representing a binary "1," the group of output rods 46, 48, 50 and 52 will represent binary code 0011 which is a "0" in the excess three binary code. In a similar manner each of the remaining nine output groups produce an excess three binary code representing a particular numerical digit which is displayed on the face of the fiber optic reader.

FIG. 8 is a schematic representation of the entire fiber optic memory and decoder for the excess three binary code showing each of the ten output groups and the locations at which each rod of each group is attached to the pertinent vertical rod. The particular connections between the output rods and the vertical rods as shown in FIG. 8 are made in accordance with the table shown in FIG. 9. If each group of output rods is denoted according to the vertical rod which they cross i.e. the first group as group 26 since output rods 46, 48, 50 and 52 cross vertical rod 26, group 2 would be group 28, group 3 would be group 30, etc., it will be seen that there are ten output groups 26, 28, 30, 32, 34, 36, 38, 40, 42 and 44.

FIG. 9 shows for each group the binary code which it produces, the digit it represents and the particular connections between the output rods and the input rods where the output rods denoted as "1" are the uppermost rods shown in any particular group in FIG. 8. For example, considering group 26, that group which produces an excess three binary code representing a "0" digit, FIG. 9 shows that rod 46 in FIG. 8 should be coupled to input rods *a*3, *a*5 and *d*2. Thus as shown in FIG. 8 vertical rods 26, 26*a*, and 26*f* are connected to output rod 46 and the same vertical rods are also connected to input rods *a*3, *a*5 and *d*2. Further it can also be seen that rod 48 is also connected to the same vertical rods which represent input rods *a*3, *a*5 and *d*2. Also output rod 50 is shown connected to vertical rods which are connected to input rods *d*2, *d*3, *d*5, *c*5 and *e*2. In a like manner, output rod 52 is also shown connected to vertical rods representing rods *d*2, *d*3, *d*5, *c*5 and *e*2. Similarly, the connections between each group of output rods and the corresponding vertical rods may be found by referring to the appropriate group in FIG. 9. Four photo diodes 10 are positioned opposite the ends of each of the output rods in each group thus producing a signal when light is emitted by an output rods but producing no signal when no light is emitted. While only one group of photo diodes 10 is shown opposite group 44 of the output rod it is to be understood that a similar group of four photo diodes would be positioned opposite the ends of the output rods in each output group (see FIG. 1).

Summarizing the operation of the excess three binary code converter shown in FIG. 8, it can be seen that when an image of a numeric character is superposed on the face or viewing area of the fiber optic reader 4, various ones of the fiber optic rods 5 will contain light while others will have no light because their ends are covered by the numeric character. Fiber optic rods 5 then serve as inputs to the eight light rods 22 in the excess three binary code converter. Each of the rods 22 have connected to them ten vertical rods which are merely extensions of each of the input rods 22. A group of four output rods then cross corresponding ones of the vertical rods and are attached in such a manner than an excess three binary code will be produced by that group which corresponds to the numeric character superposed upon the face of the fiber optic reader.

The light rods used in the actual arbitrary model were 0.1180" in diameter. It is obvious that with rods of this size the size of the numeric character to be read must be quite large. However, light guides exist which are made of precision optical fibers which are 0.003" in diameter. Obviously eight rods of this size could be used to read a numeral as small as a typewriter character.

It is understood that suitable modifications may be made in the structure as disclosed provided such modifications come within the spirit and scope of the appended claims. Having now, therefore, fully illustrated and described my invention, what I claim to be new and desire to protect by letters patent is:

1. A fiber optic encoder comprising:
(a) a plurality of input fiber optic rods,
(b) a numeric character viewing area,
(c) a plurality of light sensitive fiber optic rods,
(d) means for positioning an end of each of said light sensitive fiber optic rods in a particular portion of said viewing area,
(e) means for superposing one of a set of unique numeric characters on said viewing area to selectively cover the ends of a unique group of said light sensitive rods to prevent light from entering the covered rods,
(f) means for coupling the light and no-light from said light sensitive rods to said input rods,
(g) a plurality of output fiber optic rods, and
(h) means for selectively light coupling each of said output rods to individual ones of said input rods,
said output rods providing light and no-light outputs indicative of said represented numeric character.

2. A method of optical identification of numerical characters comprising:
forming a viewing area of 35 squares,
connecting optic fibers to specific ones of said 35 squares,
delineating a set of numeric characters each of which has a unique shape,
superposing any one of said characters on said viewing area to selectively cover a different unique group of said optic fibers, and
detecting a pattern of light and no-light in said optic fibers.

3. A fiber optic encoder as in claim 1 wherein:
any one of said output rods is light-coupled to individual ones of said input rods forming said unique group having no-light and representing a particular numeric character.

4. A fiber optic encoder comprising:
a numeric character viewing area,
a plurality of first fiber optic rods,
means for positioning an end of each of said first rods in a particular portion of said viewing area,
means for superposing one of a set of unique numeric characters on said viewing area to selectively cover the ends of a unique group of said first rods to prevent light from entering the covered rods,
a plurality of second fiber optic rods,
means for coupling the light and no-light from said first rods to said second rods,
a plurality of third optic fiber rods,
means for selectively light-coupling each of said third rods to individual ones of said second rods,
only one of said third rods providing no light output to indicate the particular numeric character superposed on said viewing area, and
means for detecting said light and no-light outputs from said third rods.

5. A fiber optic encoder as in claim 4 wherein said detecting means comprises:
a plurality of photo diodes, one for each of said third rods.

6. A fiber optic encoder as in claim 4 wherein said light-coupling means includes:
a light transfering medium having the same refractive index as the fiber optic rods.

7. A fiber optic encoder as in claim 4 wherein said selectively coupled second and third rods includes:
any one of said third rods light-coupled to the individual ones of said second rods which form said unique group having no-light and representing a particular numeric character.

8. A fiber optic encoder comprising:
a plurality of first fiber optic rods,
coding means connected to said first rods for representing a numeric character by providing light or no-light to each of said first rods,
a plurality of groups of second fiber optic rods, and
means for selectively light-coupling each individual rod of each of said groups to said first rods,
said second rods forming any one of said groups producing light or no-light outputs the combination of which represents the numeric character designated by said coding means.

9. A fiber optic encoder as in claim 8 wherein said coding means comprises:
a numeric character viewing area,
a plurality of light sensitive fiber optic rods,
means for positioning an end of each of said light sensitive fiber optic rods in a particular portion of said viewing area, means for superposing one of a set of unique numeric characters on said viewing area to selectively cover the ends of a unique group of said light sensitive rods, to prevent light from entering the covered rods, and
means for coupling the light or no-light from said light sensitive rods to said first fiber optic rods.

10. A fiber optic encoder as in claim 7 wherein said light coupling means includes:
a light transferring medium having the same refractive index as the fiber optic rods.

11. A fiber optic encoder as in claim 7 wherein:
the combination of light and no-light outputs from each of said groups provides an excess three binary code representation of said numeric character designated by said coding means.

12. A fiber optic encoder comprising:
a numeric character viewing area,
a plurality of first fiber optic rods,
means for positioning an end of each of said first rods in a particular portion of said viewing area,
means for superposing one of a set of unique numeric characters on said viewing area to selectively cover the ends of a unique group of said first rods to prevent light from entering the covered rods,
a plurality of groups of second fiber optic rods,
means for selectively light-coupling each individual rod of each of said groups to said first rods,
said second rods forming any one of said groups producing light or no-light outputs indicative of a binary one and a binary zero respectively and the combination of which represents in binary excess three code the numeric character designated by said coding means, and
means for detecting said light or no-light outputs from said second rods.

13. A fiber optic encoder as in claim 12 wherein said detecting means comprises:
a plurality of photo diodes, one for each of said rods in each of said groups.

14. A fiber optic encoder as in claim 12 wherein said selective coupling between said first rods and individual rods of a particular one of said groups representing a particular numeric character includes:
in each group, light coupling each rod which should represent a binary zero to each of the rods in the unique group of first rods whose ends in said viewing area are covered by said numeric character and which have no-light, and
light coupling the remaining rods which should represent a binary one to each of the remaining first rods whose ends in said viewing area are not covered by said numeric character and which have light.

References Cited

UNITED STATES PATENTS

| | | | |
|---|---|---|---|
| 2,881,976 | 4/1959 | Greanias | 340—380 |
| 3,109,065 | 10/1963 | McNaney | 250—227 |
| 3,177,470 | 4/1965 | Galopin | 250—219 |

RALPH G. NILSON, *Primary Examiner.*

M. ABRAMSON, *Assistant Examiner.*